US007077336B2

(12) United States Patent
d'Ornano

(10) Patent No.: US 7,077,336 B2
(45) Date of Patent: Jul. 18, 2006

(54) INFORMATION-DISPLAYING UNIT

(76) Inventor: Gilles François Dominique d'Ornano, Av. Sernambetiba 6250/606 Barrada Tijuca, Rio de Janeiro, RJ (BR) 22630-012

( * ) Notice: Subject to any disclaimer, the term of this patent is extended or adjusted under 35 U.S.C. 154(b) by 191 days.

(21) Appl. No.: 10/490,889

(22) PCT Filed: Nov. 22, 2002

(86) PCT No.: PCT/BR02/00160

§ 371 (c)(1),
(2), (4) Date: Mar. 25, 2004

(87) PCT Pub. No.: WO03/052722

PCT Pub. Date: Jun. 26, 2003

(65) Prior Publication Data

US 2004/0194357 A1 Oct. 7, 2004

(30) Foreign Application Priority Data

Nov. 23, 2001 (BR) .................................... 0105444
Aug. 23, 2002 (BR) ............................... C10105444
Nov. 21, 2002 (BR) ................................ C2010444

(51) Int. Cl.
*A01G 27/00* (2006.01)
*B67D 5/08* (2006.01)
*A24F 25/00* (2006.01)
*A62C 5/00* (2006.01)

(52) U.S. Cl. ............................ 239/71; 239/72; 239/67; 239/51.5; 239/311; 239/338

(58) Field of Classification Search .................. 239/71, 239/72, 67, 70, 16, 17, 18, 51.5, 311, 338; 96/25, 26, 224
See application file for complete search history.

(56) References Cited

U.S. PATENT DOCUMENTS 4,778,496 A * 10/1988 Conrad ......................... 55/472
5,266,090 A * 11/1993 Burnett ......................... 55/333
5,893,939 A * 4/1999 Rakocy et al. ................ 55/471
6,494,940 B1 * 12/2002 Hak ............................ 96/224
6,616,736 B1 * 9/2003 Massey et al. ................. 96/25

* cited by examiner

*Primary Examiner*—Davis Hwu
(74) *Attorney, Agent, or Firm*—Bachman & LaPointe, P.C.

(57) ABSTRACT

The present invention refers to an information-displaying unit (1) which has a body of a determined geometrical shape internally with an illumination system having in the narrower portions thereof (12) an arrangement for installation of water atomizing nozzles of a body climatization system, and a pedestal (14) to house the components of said system. The right side portion (10) and the left side portion (10') of the information-displaying unit (1) have an arrangement for installation of an information-displaying device (11).

8 Claims, 3 Drawing Sheets

INFORMATION-DISPLAYING UNIT

TECHNICAL FIELD

The present invention refers in general to devices for displaying visual advertisement and in particular to a unit for displaying information, whether advertisement or not, with an arrangement for installation of a body climatization system of atomized water especially for use in tropical and semitropical countries, and an interactive and fragrance dispensing system. There is also the provision of an actuating assembly for the body climatization and fragrance dispensing systems of the unit by means of a coin-acceptor, smart card or the like allowing actuation of said systems for a given period of time. The displaying unit of present invention is also to be used in public areas as urban furniture to avoid insolation and thermal shock and display tourism information and general information and one of the sides thereof being capable of housing advertisement messages, for example.

BACKGROUND ART

Devices for displaying advertisement having panels intended to carry advertisement information or not, with or without illumination systems, are known in the art. In general such panels have a base portion and a portion intended to carry ads and/or information to be displayed.

However, nowadays climatization systems for closed or open environments by means of water atomization into minute drops in special nozzles are known. Such systems allow cooling without the aid of central air-conditioning units. Such principle per se is used in present invention for purposes of body climatization without the discomfort of deep immersion into water, such as in showers.

In view of the above, there is the need to create a panel or similar device that allows the installation of said body climatization system and at the same time provides in the sides thereof a space for displaying information. Such panel also being provided with a an actuation assembly for the body climatization and fragrance dispensing systems of the unit by means of a coin acceptor, smart card or the like allowing actuation of said systems for a given period of time.

SUMMARY OF THE INVENTION

Therefore, it is an object of present invention to provide an information displaying unit, whether advertisement or not, with an arrangement for installation of a body climatization system by means of atomized water.

It is a further object of present invention to provide an information displaying unit, whether advertisement or not, with an arrangement for installation of a body climatization system by means of atomized water and a space for displaying information in a movable way or not in a panel of transparent material with rear illumination (backlight).

It is still a further object of present invention to provide an information displaying unit, whether advertisement or not, with an arrangement for installation of a body climatization system by means of atomized water and a set of decorative lights acting together with the atomized nozzles. In this case, the information-displaying unit of present invention would be used as furniture in gardens and/or pools, and even verandah.

It is a further object of the present invention to provide an information-displaying unit, whether advertisement or not, with an arrangement for installation of a body climatization system by means of water atomization and incorporated in the structure thereof an interactive sound system capable of transmitting messages or music, whether advertisement or not.

It is a further object of the present to provide an information-displaying unit, whether advertisement or not, with an arrangement for installation of a body climatization system by means of water atomization the unit also having an odor and/or fragrance dispensing system or a system for dispensing cosmetic products in general.

It is a further object of the present invention to provide an information-displaying unit, whether advertisement or not, with an arrangement for installation of a body climatization system by means of water atomization that may contain in its upper part an electronic module and a digital display, whether electro luminescent or not, said module displaying general information such as time, temperature, air quality and/or advertisement messages in a fixed fashion or passing in the digital display. The body climatization and fragrance dispensing systems contained in said information-displaying unit capable of being actuated by an actuation assembly (built-in or overlapped the unit) of the unit's systems by means of a coin-acceptor, smart card or the like allowing actuation of said systems for a given time period.

BRIEF DESCRIPTION OF THE DRAWINGS

The present invention will be described in details with reference to the attached drawings, which are intended to illustrate the invention rather than limit the same.

DESCRIPTION OF THE PREFERRED EMBODIMENT

Figure 1:
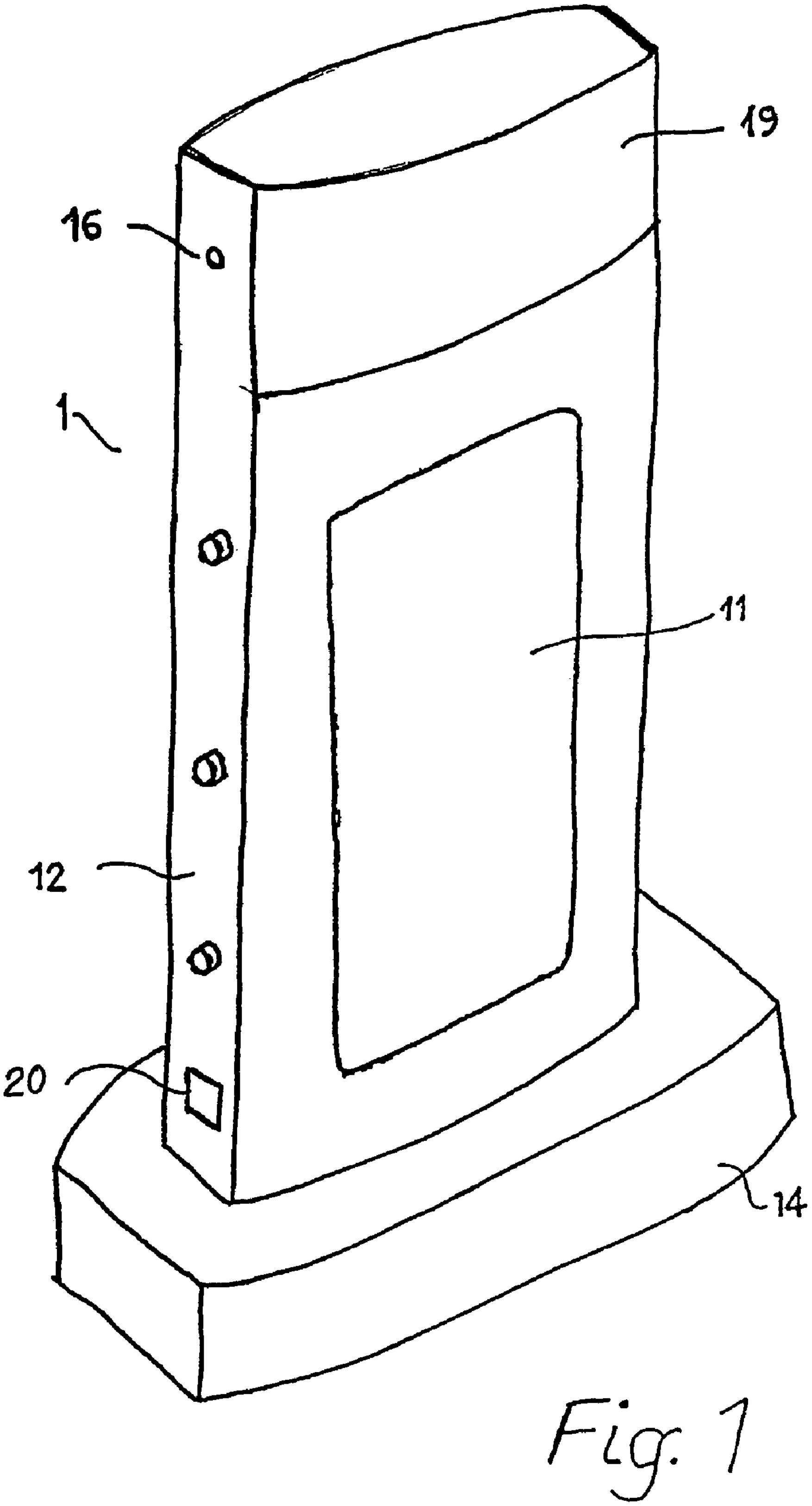
FIG. 1—a perspective view of the information-displaying unit of present invention.
Figure 2:
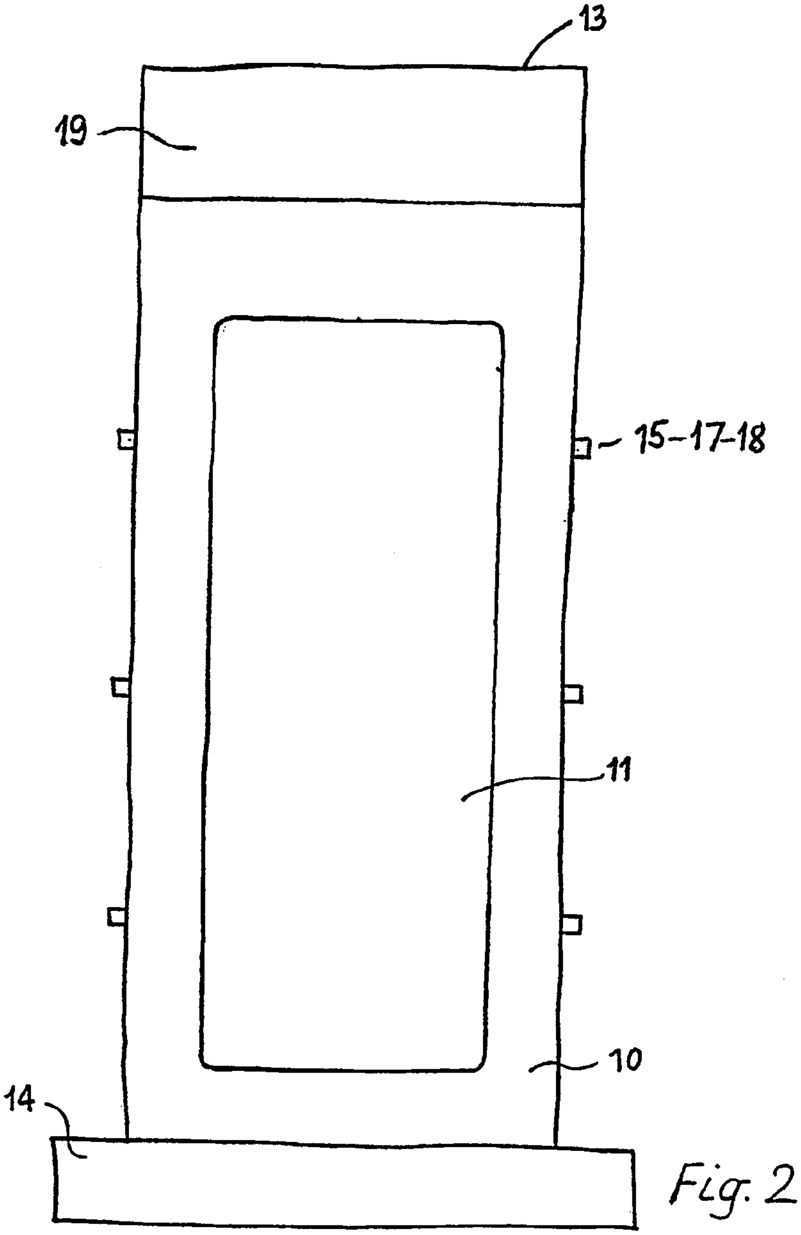
FIG. 2—a view of one side thereof, the other side being identical.
Figure 4:
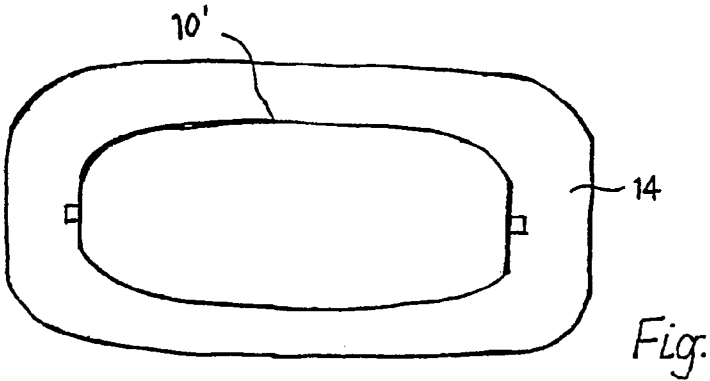
FIG. 4—an upper view thereof.

The present invention will be described in details with reference to the attached drawings wherein numeral 1 represents the information-displaying unit.

With reference to FIGS. 1, 2, 3, and 4 the information-displaying unit of present invention is comprised of a right side panel 10 having a determined geometrical shape (in the drawings, as an example, a convex almost elliptical shape was illustrated, however, the shape is not a limiting feature for the invention) with an upper end, a lower end and two lateral ends. The left side panel 10' is similar to right side panel 10. Both side panels have an arrangement for installation of an information-displaying device 11 intended to display advertisement and text for information purposes. Such information-displaying device 11 may be any fixed or movable device to transmit information. The information-displaying device 11 has internally illumination means in order to allow night visibility and for aesthetical purposes. Such means may comprise any illumination means known in the art.

Above side panels 10, 10' there is provided an upper portion 19 also formed of side panels 19*a*, 19*b* (not shown in the drawings) intended to house an electronic module with digital display, whether luminescent or not, to transmit information of public utilization, such as time, temperature, air quality and/or advertisement messages or not passing in the digital display.

Figure 3:
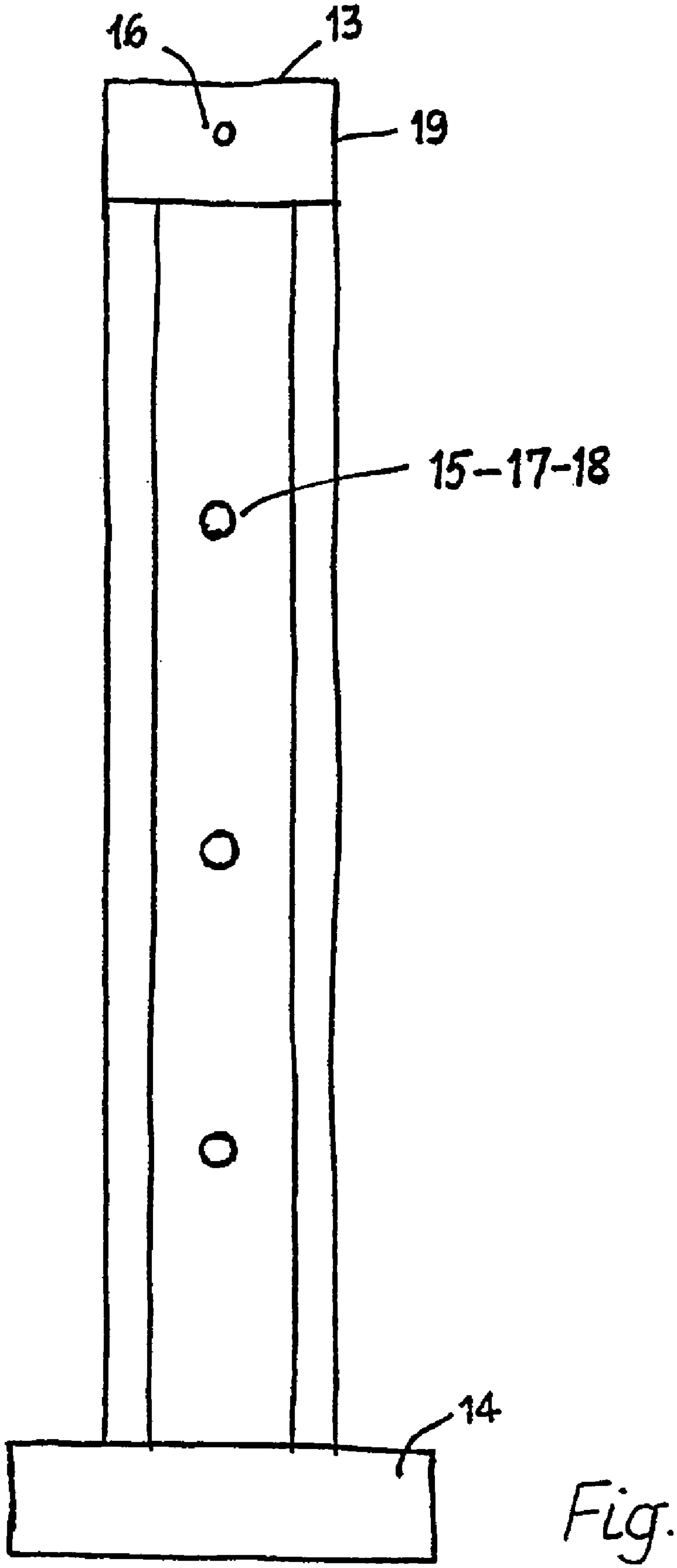
FIG. 3—a front view thereof.

As better shown in FIG. 3, the unit of present invention has two narrower panels 12 located in each end of the unit. Such narrower panels 12 have double function: to provide the closing between side panels 10 and 10' in each side of the unit and accommodate the atomization nozzles of the body climatization system 15 illustrated in the Figures. Said narrower panels 12 can also house an interactive sound system, generally indicated by reference numeral 16, capable of transmitting messages or music. Furthermore, said narrower panels 12 are also provided for installation of an odor and/or fragrance dispensing system or a system for dispensing cosmetic products in general.

The information-displaying unit of present invention still has an arrangement for installation of an actuation assembly 20 of the body climatization and fragrance dispensing systems of the unit for a given period of time. Such assembly 20, represented in the drawings as installed in the narrower panel 12 although it may be located in other place or internally without affecting the object of the present invention, may contain a coin-acceptor or smart card-acceptor or the like allowing actuation of said systems for a given period of time.

The upper portion of the unit has a cover 13 intended to close the upper portion of the unit and provide suitable finishing for the same.

The lower portion of the unit of present invention has a pedestal 14 also of any determined geometrical shape (in the Figures an almost elliptical shape is illustrated) that holds the unit assembly of present invention and allows installation of the components of the body climatization system (for example, solenoid valves, pressurizer, infrared contactor or sensors, electronic actuation commands, timer, and etc.). This pedestal 14 further to holding the unit per se provides a ramp to avoid eventual deposit of condensed water.

The displaying of information may be made by means of specific adhesives to be installed in the side panels.

The materials to be used in manufacturing the unit of present invention include any material commercially available, namely, fiberglass, brushed or polished aluminum, polypropylene, polystyrene, etc.

The invention claimed is:

1. Information-displaying unit, housing a body climatization system, comprising:

a right side portion and a left side portion of determined geometrical shape;

two narrower portions to provide a closing with said side portions and wherein the narrower portions have an arrangement for installation of atomization nozzles of a body climatization system;

an upper portion of a shape similar to that of right side portion and left side portion accommodating an electronic module with digital display, electro luminescent or not to display information;

an assembly for actuating the systems of said unit by means of a device that releases the functioning of said systems for a given period of time wherein the assembly comprises at least one of a coin-acceptor device, a smart card and a pre-paid actuating device; and a pedestal of a determined geometrical shape.

2. Unit, as in claim 1, 6 or 8, wherein the right side portion and/or the left side portion have an arrangement for installation of an information-displaying device.

3. Unit, as in claim 1 or 6, wherein internally the information-displaying unit has an illumination system that provides illumination for the side portions.

4. Unit, as in claim 3, wherein internally the unit also has an arrangement for installation of a set of decorative lights, colored or not, that provides for illumination for the mist of the climatization system.

5. Unit, as in claim 1 or 8, wherein the narrower portions have an arrangement for installation of an interactive sound system, an odor and/or fragrance dispensing system and/or a system for dispensing cosmetic products.

6. Information-displaying unit, housing a body climatization system, comprising:

a right side portion and a left side portion of determined geometrical shape;

two narrower portions to provide a closing with said side portions and wherein the narrower portions have an arrangement for installation of atomization nozzles of a body climatization system wherein an arrangement for installation of an interactive sound system, an odor and/or fragrance dispensing system and/or a system for dispensing cosmetic products;

an upper portion of a shape similar to that of right side portion and left side portion accommodating an electronic module with digital display, electro luminescent or not to display information;

an assembly for actuating the systems of said unit by means of a device that releases the functioning of said systems for a given period of time; and a pedestal of a determined geometrical shape.

7. Unit, as in claim 6 or 8, wherein the assembly comprises at least one of a coin-acceptor device, a smart card and a pre-paid actuating device.

8. Information-displaying unit, housing a body climatization system, comprising:

a right side portion and a left side portion of determined geometrical shape;

two narrower portions to provide a closing with said side portions and wherein the narrower portions have an arrangement for installation of atomization nozzles of a body climatization system wherein the narrower portions have an arrangement for installation of an interactive sound system, an odor and/or fragrance dispensing system and/or a system for dispensing cosmetic products;

an upper portion of a shape similar to that of right side portion and left side portion accommodating an electronic module with digital display, electro luminescent or not to display information;

an assembly for actuating the systems of said unit by means of a device that releases the functioning of said systems for a given period of time;

a pedestal of a determined geometrical shape;

an illumination system that provides illumination for the side portions; and the unit has an arrangement for installation of a set of decorative lights, colored or not, that provides for illumination for the mist of the climatization system.

* * * * *